THIN MAGNETIC FILM MEMORY STRUCTURE

Filed Aug. 4, 1961 2 Sheets-Sheet 1

PHILIP SMALLER
INVENTOR.

BY Nathan N. Kallman

ATTORNEY

THIN MAGNETIC FILM MEMORY STRUCTURE

Filed Aug. 4, 1961 2 Sheets-Sheet 2

PHILIP SMALLER
INVENTOR.

BY Nathan N. Kallman

ATTORNEY

United States Patent Office 3,230,515

Patented Jan. 18, 1966

3,230,515

THIN MAGNETIC FILM MEMORY STRUCTURE

Philip Smaller, Portola Valley, Calif., assignor to Ampex Corporation, Redwood City, Calif., a corporation of California Filed Aug. 4, 1961, Ser. No. 129,461
16 Claims. (Cl. 340—174)

This invention relates to information storage devices and more particularly to devices employing thin magnetic films as storage media.

The search for information processing equipment capable of storing information with ever increasing efficiency has led to considerable interest in the possibilities of thin films of various materials as potential storage devices. This interest is heightened by the attractive possibilities that such structures may be able to store information with an extreme compactness by providing hitherto unobtainable high information storage densities. In addition it is usually possible to reduce the driving power requirements as well as the heat dissipation limitations as the size of a particular storage device is reduced. One field, for example, in which a substantial reduction in the size of the components required is of particular interest lies in the development of computers for installation in missiles and space vehicles. Obviously the space limitations imposed upon any computer which may be installed within a space vehicle are severe.

One type of thin film memory device which is of particular interest in microminiaturized equipment has been the thin magnetic film memory. Such structures typically utilize storage elements in the form of planar films having thicknesses of the order of 2,000 angstrom units. These elements may be fabricated by vacuum deposition onto a glass substrate under the influence of a magnetic field. The applied magnetic field causes the deposited film to exhibit a preferred direction of magnetization with all domains of an area of such a film lying parallel to the direction of this field. The materials commonly employed for the deposition of the film comprise alloys of iron, nickel and cobalt in varying proportions, one of which may be the alloy which is known as Permalloy. The magnetic characteristic of the film deposited in the described manner exhibits a substantially rectangular hysteresis loop oriented in the preferred direction of magnetization.

One way in which information may be stored in such a film is by controlling the direction of magnetization of the magnetic domains in respective discrete portions of the film. The preferred or easy direction of magnetization is understood to encompass domain orientation in a plane in which the rectangular hysteresis loop is exhibited. Thus the magnetic domains may be aligned either in a first direction or in a second direction at 180° with respect to the first direction. In either case the corresponding magnetic state is retained until changed by an applied magnetic field.

In thin magnetic films of the type described, control of the magnetic state in discrete portions of the film is achieved predominantly by movement of the domain wall along the film. This wall may be considered a boundary between respective domains oriented in opposite directions. Information storage arrangements utilizing such magnetic films commonly establish the domain orientation of particular portions of the film in succeeding time intervals. Ideally the resultant magnetization configuration is a pattern of parallel domains oriented in one or the other of the two opposite directions which can be considered to correspond to the respective digits of a binary code. Unfortunately it has been heretofore impossible to obtain a magnetization pattern which comes even close to approaching this ideal configuration. The domain wall travel does not inherently provide for a parallel distribution of magnetic storage states over the film, but rather the domain wall travels under the influence of an applied magnetic field and the particular variations in influencing factors encountered in the film itself. As a result, while the thin magnetic film is theoretically capable of storing information with high density in an extremely compact structure, previously known practical embodiments of a thin magnetic film for storing information in the manner described have not been able to achieve the desired high density. This is primarily due to the fact that the domain walls are anything but parallel and substantial distances must be provided between succeeding magnetization portions of the film in order to prevent the domain walls from converging and blending into each other to cause the information to be destroyed or stored erroneously.

It is therefore a general object of the invention to provide an improved information storage arrangement utilizing thin magnetic films.

It is an object of this invention to provide a thin magnetic film in which information may be stored with increased density.

It is another object of this invention to provide a thin magnetic film structure in which the position of respective magnetic domain regions may be controlled with increased precision.

It is a further object of the invention to provide a thin magnetic film structure arranged to limit the extent of the shift of domain orientation in response to a particular applied magnetic field.

Briefly, in accordance with the invention a thin magnetic film structure is provired which serves to limit the travel of the domain walls as they progress along the magnetic film under the influence of an applied magnetic field. In the provided structural arrangement, the domain wall is caused to travel by discrete spatial increments and the aligned domains are confined in defined regions of the film so that the resulting boundaries are aligned as lateral walls substantially parallel to each other. In this fashion the domain boundaries may be arranged very close together and a substantial increase in the density of the information stored in the film is effected.

The mechanism by which the domain walls are made to align themselves in this fashion is the provision, in accordance with the invention, of a repetitive or cyclical variation in the coercive force of the magnetic film as a function of distance along the film in the direction of domain wall travel. Each line of maximum coercive force (corresponding to a lateral domain wall) serves as an effective energy barrier to limit the extent of domain reorientation to discrete increments as the applied magnetic field is increased.

In one particular arrangement in accordance with the invention, the cyclical variation of coercive force is achieved by employing a structure having a repetitive variation in the thickness of the deposited magnetic film. One such arrangement exhibits a profile in cross section which is similar in appearance to a repetitive sawtooth configuration. Another such arrangement provides a profile in which the thickness is alternately varied in stepwise fashion between maximum and minimum dimensions. Another arrangement in accordance with the invention achieves the desired repetitive variation in coercive force by utilizing a film of substantially uniform thickness but by controlling the composition of the material to develop alternate portions of high and low coercive force materials in a cyclical pattern.

Previously known thin magnetic film structures which are utilized in the manner described hereinabove to store information have been limited insofar as information storage density is concerned to a maximum density of from seven to ten information bits per linear inch. By contrast thin magnetic film structures deposited in accordance with the present invention are readily capable of storing information with a density approaching one thousand information bits per linear inch.

A better understanding of the invention may be gained from a consideration of the following detailed description, taken in conjunction with the drawings, in which.

Figure 6:
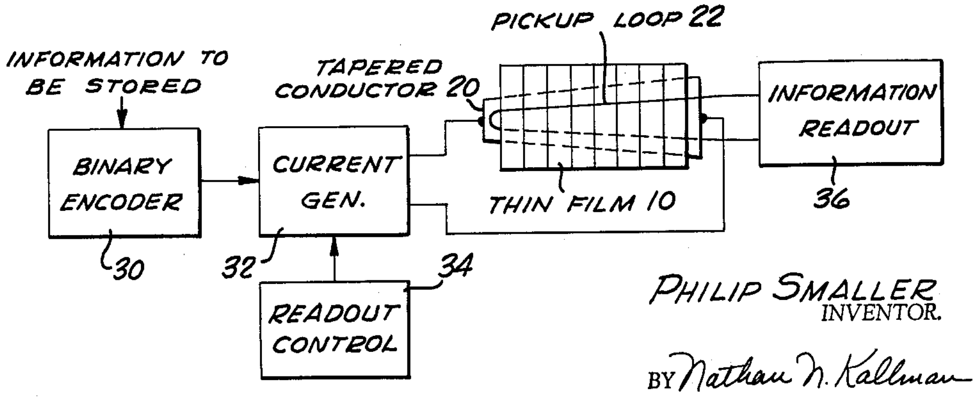

FIGURES *5a–5f* are respective views showing stages in the storage of information within a thin magnetic film; and FIGURE 6 is a combination block and schematic diagram of an information storage system in accordance with the invention.

Figure 1:
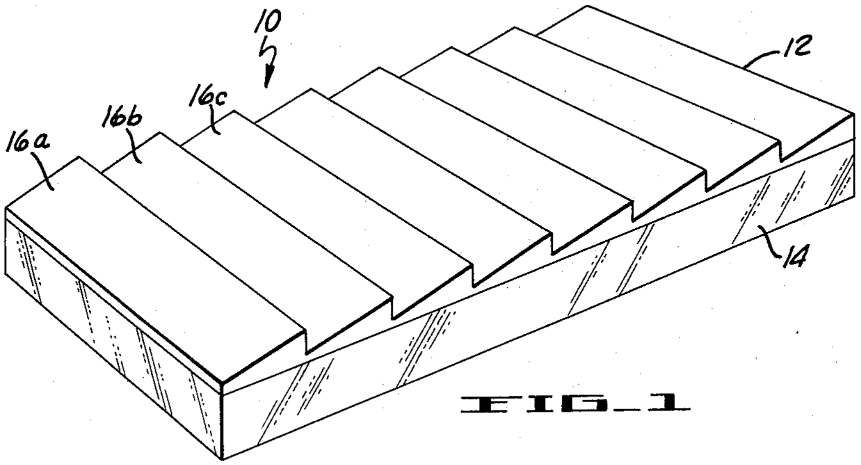
FIGURE 1 is one particular structural arrangement in accordance with the invention.

Referring to FIGURE 1, there is shown therein a structure in accordance with the invention which may be considered a portion of a more complete magnetic film memory device. The part shown in perspective in FIGURE 1 is adequate to illustrate the principles of the invention. It is shown as a thin film magnetic memory device 10 comprising a thin layer 12 of a magnetic material deposited upon a substrate 14 which may advantageously be of glass or of other materials suitable for this purpose. The thickness of the film 12 varies in a repetitive pattern, with the profile in cross section of the magnetic film 12 of FIGURE 1 representing a sawtoothed pattern. The sawtoothed pattern developed in the magnetic film 12 in accordance with the invention serves to divide the film into a plurality of sections such as 16*a*, 16*b* and 16*c* of like dimensions. The maximum thickness dimension of the film 12 may typically be of the order of 2000 angstrom units. Minimum thickness dimensions of the magnetic film 12 may range from approximately $1/10$ to $2/3$ the dimension of maximum thickness and may typically be of the order of 1000 angstrom units. By means of the repetitive variations in thickness of the magnetic film 12, the coercive force of the magnetic film is caused to vary repetitively in accordance with the invention. Upon the application of a magnetic field which has a gradient such that the field magnitude diminishes from left to right, the magnetization or domain orientation of the discrete portions of the film defined by the variations of thickness are caused to respond to the applied magnetic field in an incremental fashion. In response to the applied magnetic field, for example, the domain wall may proceed across the portion 16*a* until it reaches the boundary between the portions 16*a* and 16*b*. At this point there is a sudden increase in the coercive force presented by the film 12 because of the sharp reduction of the thickness of the film. Thus the domain wall is arrested at this boundary until a sufficient magnetic field is applied to cause the wall to move through the high coercive force region and subsequently through the entire portion 16*b*. By controlling the applied field in a manner described in detail hereafter, any desired pattern of domain orientations may be established within the magnetic film 12 to represent stored information. Through the use of the depicted structure in accordance with the invention, the domain boundaries are maintained substantially straight and parallel without resort to special configurations for controlling the distribution of the applied magnetic field, as has heretofore been necessary. In consequence, there is a substantially greater packing density than has thus far been possible and this is accomplished with improved accuracy in the storage, retention, and readout of information in the structure which exemplifies the invention. A typical figure for the width of the discrete film segments such as the portion 16*a* is of the order of .001″ or roughly 100 times the maximum thickness of the film 12. It can thus be seen that packing densities approaching 1000 bits per linear inch may readily be accomplished in the structural arrangements prepared in accordance with the invention.

Figure 2:
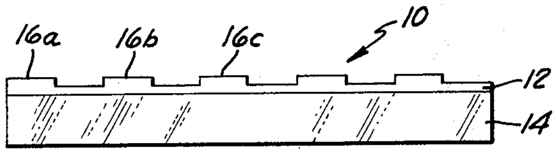
FIGURE 2 is another particular structural arrangement in accordance with the invention.
Figure 3:
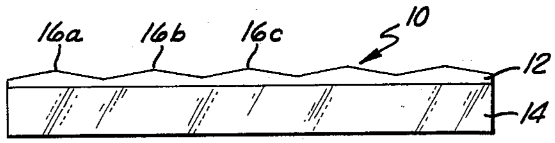
FIGURE 3 is yet another particular structural arrangement in accordance with the invention.
Figure 4:
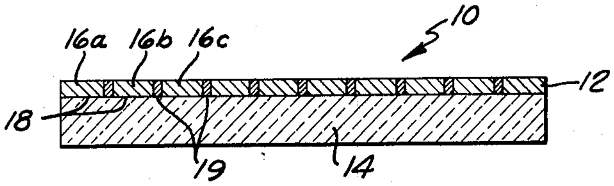
FIGURE 4 is still another structural arrangement in accordance with the invention.

FIGURES 2, 3, and 4 illustrate other arrangements of magnetic film storage devices prepared in accordance with the invention. In each of these figures a device 10 is shown which may be considered a portion of an overall magnetic film storage memory comprising a film 12 deposited as before upon a substrate 14. FIGURES 2 and 3 depict two different arrangements for varying the thickness of the magnetic film in a repetitive manner in order to produce a cyclic or periodic variation in the coercive force presented by the film 12.

In FIGURE 4 a film 12 is shown which has substantially uniform thickness but which is nonhomogeneous in that it is developed by the deposition of two different materials in alternate portions thereof in order to produce the desired periodic pattern of variation in coercive force. The portions of the film 12 such as those designated 18 are composed of a material exhibiting a low coercive force and thus are relatively easily magnetizable. In between adjacent pairs of the segments such as 18 are segments 19 of a material exhibiting a relatively large coercive force. Thus in FIGURE 4 the portions of material such as 19 serve to limit the extent of travel of domain reversal through the film 12 from one segment 18 to the next under the influence of an applied magnetic field. With each of the structural arrangements shown, the information packing density is very substantially increased over what has hitherto been possible in prior art devices.

Various configurations of magnetic film structure in accordance with the present invention may be fabricated by the vapor deposition of magnetic film material in the presence of a magnetic field. One way of obtaining the desired repetitive variation in coercive force is through the use of special grids or shields interposed between the source of the material which is being deposited and the substrate. This technique of selective shielding during the deposition process may be complemented by steps of selective etching in order to develop the desired configuration. For example the inhomogeneous magnetic film structure shown in FIGURE 4 may be developed by the vapor deposition of a uniform film of low coercive force, followed by the etching away of the film at segments corresponding to the location of the high coercive force materials 19, followed by the deposition of a high coercive material to fill the slots remaining from the selective etching process. The structure of FIGURE 2 may be provided by vapor depositing a layer of uniform thickness, then interposing a grid of suitably spaced shielding members in a position to block the deposition of further material on selected portions of the film, and continuing the vapor deposition process to build up the remaining portions to the desired added thickness as shown. The remaining structures shown may be fabricated by vapor depositing the magnetic film to a predetermined thickness and then etching selected portions of the film in order to provide the prescribed configuration. Other processes for obtaining the desired configurations exhibiting a repetitive pattern of variations of coercive force in accordance with the invention will occur to those skilled in the art.

FIGURES *5a–5f* exhibit the way in which information may be stored in a device in accordance with the invention. In these figures a device 10 is shown in various stages of magnetization. The device 10 may be any one of those shown in FIGURES 1–4 or equivalent structures prepared in accordance with the invention. In FIGURES 5a–5f the actual domain walls or boundaries between adjacent portions of opposite magnetization are shown as solid dividing lines whereas the regions of variation in coercive force which serve to limit the travel of the domain walls across the extent of the structure 10 are represented by dashed lines. As shown, the easy direction of magnetization for the magnetic film is represented as being the vertical direction and the direction of domain travel is in the horizontal direction from left to right. At the bottom of each FIGURE 5a–5f, a miniature graph is shown representing the configuration of the applied magnetic field which produces the corresponding magnetization conditions depicted in the respective FIGURES 5a–5f. For purposes of illustration only, the upward direction of magnetization has been chosen to represent a binary 0 while the downward direction of magnetization has been selected to correspond to a binary 1.

Figures 5A, 5B, 5C, 5D, 5E, 5F:
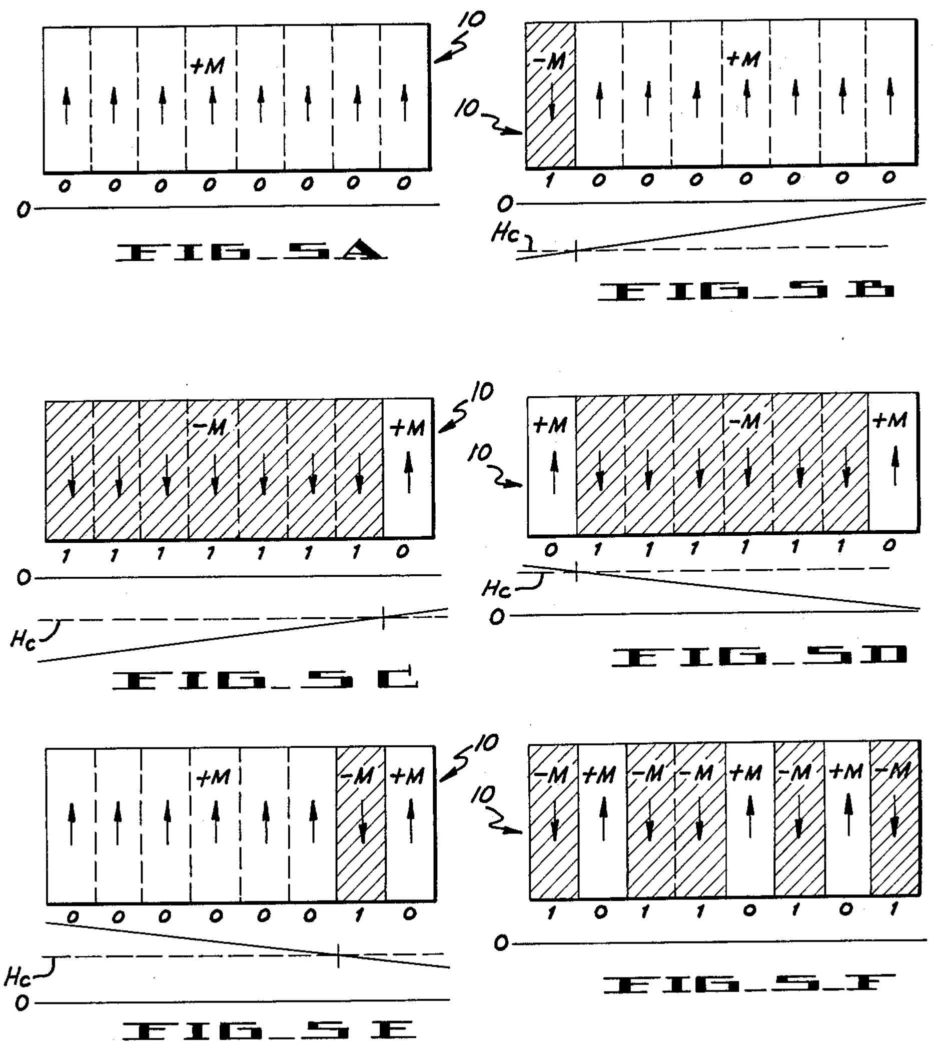

As seen in FIGURE 5a, the entire structure 10 is magnetized in the upward direction corresponding to the storage of all zeros. It is assumed that this is the state which is established during the initial deposition of the magnetic film 12 upon the substrate 14 and consequently the accompanying or applied magnetic field is shown to be zero. Assume that a binary 1 is to be stored in a selected segment of the device 10. It is entered at the left side of FIGURE 5b by the application of a magnetic field having a gradient such that the field diminishes in magnitude from left to right and which exceeds the level of the coercive force $H_c$ only in the extreme left hand portion of the device 10. In consequence, only the section of the device 10 which is farthest to the left experiences a reversal of magnetization to represent the storage of a binary 1 at that point. In FIGURE 5c the reversal of magnetization is stepped across the device 10 from left to right by increasing the applied magnetic field in the negative direction so that the coercive force of each of the succeeding sections is exceeded one by one. In FIGURE 5c as a result all of the discrete segments of the device 10 are shown magnetized in the downward direction except the segment at the very right hand edge which is still magnetized in the upward direction. In FIGURES 5d and 5e a positive magnetic field is applied having a gradient such that the field strength decreases from left to right. It can be seen that the magnitude of this magnetic field is increased gradually until the positive direction of magnetization which is initially induced at the left hand edge travels across the device 10 from left to right until all but the two segments on the right hand side are again magnetized in the upward direction. It can thus be seen how any selected one of the respective segments of the device 10 which are defined by the repetitive variations in coercive force in accordance with the invention may be magnetized to accord to either a binary 0 or a binary 1. The particular magnetization state to be stored is simply stepped in from the left hand edge of the device 10 to the particular segment which is to be so magnetized. The order of storage proceeds from right to left although the direction of traversal of domain orientation proceeds from left to right so that the segment of the very right hand edge of the device 10 becomes magnetized first in accordance with its information storage state, the segment second from the right becomes magnetized in accordance with its stored information next and so on. FIGURE 5f represents a typical configuration of magnetization states according to a particular binary coded word 10110101. Since it is understood that information storage is completed in the device 10 of FIGURE 5f, there is no applied magnetic field shown since none is necessary until the storage is to be changed.

FIGURE 6 is a partial block diagram of an information storage system including a thin film magnetic storage device in accordance with the invention. Such a device 10 is shown in FIGURE 6 in conjunction with a tapered sheet conductor 20 connected to a current generator 32 so that a magnetic field having a suitable gradient, as already described, may be applied to the thin film device 10. Information to be stored is applied to a binary encoder 30 where it is transformed to appropriate arrangements of binary digits suitable for controlling the current generator 32 which in conjunction with the tapered conductor 20 produces the magnetic field for establishing the corresponding magnetization states within the thin film 10. In the manner already described, the magnetization states of corresponding portions of the thin film 10 are controlled in accordance with the information to be stored.

The readout of information stored in magnetic film storage devices prepared in accordance with the invention may be achieved by known arrangements. As shown in FIGURE 6, an information readout system may use an inductive pickup loop 22 which is inductively coupled to the thin film device 10 and connected to an information readout stage 36. A readout control stage 34 is shown connected to the current generator 32 in order to effect the readout of the stored information from the thin film device 10. Readout is accomplished by gradually increasing the nonuniform magnetic field produced by current in the tapered sheet conductor 20. As this field increases, the discrete individually magnetized portions of the film device 10 are driven to assume a corresponding magnetization direction. If this produces a reversal of domain orientation in an individual segment, that reversal is manifested by an induced voltage on the pickup loop 22. If no reversal of magnetization is produced, as in the case when the domain orientation is already in the same direction as the magnetic field, there is no induced voltage on the pickup loop 22. Thus stored domain orientations in a first direction corresponding to a particular binary digit induce voltages on the pickup loop 22 at particular points in time corresponding to the location of the individual segments along the thin film device 10. Conversely those segments having a domain orientation in the opposite direction corresponding to the other binary digit produce no such voltage output on the pickup loop 22. Consequently as the field developed by the conductor 20 and the current generator 32 under the influence of the readout control stage 34 is gradually increased, the information stored in the thin magnetic film 10 is read out by the pickup loop 22 and the information readout device 36.

With the arrangement shown in FIGURE 6, the readout process there employed destroys the stored information states and the entire film is returned to one particular direction of domain orientation.

Other arrangements for reading out stored information from a thin magnetic film are known and may be employed in connection with the practice of the present invention. One such method, for example, provides information readout in a nondestructive fashion through use of the Kerr magneto-optic effect. In this method, polarized light is directed upon the individual storage segments of the film and the way in which the direction of polarization of the light is shifted by the discrete segments of the film is detected as an indication of the direction of domain orientation thereof and consequently as an indication of the particular binary digits stored in the individual segments. It will be appreciated that the more precise alignment of the domain walls which is effected in the arrangements of the present invention produces a manifold improvement in the restrictions necessarily imposed upon the positioning of the polarized light beam by arrangements hitherto known in the art. Regardless of the readout techniques employed, the more precise alignment of the domain walls effected in the arrangements of the present invention advantageously simplifies the limitation previously imposed upon such readout techniques.

Although there have been described above specific arrangements of a thin magnetic film memory structure in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. An information storage device comprising: a substrate, and a thin film of a magnetic material capable of assuming bistable states of magnetic remanence deposited on the substrate and arranged to exhibit a preferred direction of magnetization, said thin film being arranged in a predetermined configuration providing repetitive variations of coercive force as a function of distance along the film for selectively confining domain reorientation in response to an applied magnetic field.

2. An information storage device comprising: a glass substrate, and a thin film of a magnetic material capable of assuming bistable states of magnetic remanence deposited on the substrate and arranged to exhibit a preferred direction of magnetization, said thin film being arranged in a preselected configuration providing a repetitive variation of coercive force as a function of distance in at least one direction along the film for selectively limiting the position of domain walls within the film.

3. An information storage device comprising: a thin film of a magnetic material capable of assuming bistable states of magnetic remanence and exhibiting a preferred direction of magnetization, and means for applying a magnetic field to align the domains of selected portions of the film in a particular pattern representative of stored information, said thin film being arranged in a predetermined configuration providing a repetitively varying coercive force for causing the pattern of domains to change under the influence of an applied magnetic field by a predetermined incremental amount.

4. An information storage device comprising: a thin film of a magnetic material capable of assuming bistable states of magnetic remanence and exhibiting a preferred direction of magnetization, and means for storing information in said film in the form of a pattern of controlled domain orientations as a function of distance along the film, said thin film exhibiting a repetitive variation in coercive force as a function of distance along the film in order to maintain the lateral walls of said domains substantially parallel along the extent of the film.

5. An information storage device comprising: a thin film of a magnetic material capable of assuming bistable states of magnetic remanence and exhibiting a repetitive variation in coercive force in at least one direction along the film, and means for controlling the direction of magnetization in discrete portions of the film including magnetic field applying means.

6. An information storage device comprising: a thin film of a magnetic material capable of assuming bistable states of magnetic remanence and exhibiting a preferred direction of magnetization, and means for controlling the direction of magnetization in discrete portions of the film including magnetic field applying means, said thin film having a repetitive variation in thickness thereof taken along its length in order to provide a repetitive variation of coercive force along the length of the film.

7. An information storage device comprising: a thin film of a magnetic material capable of assuming bistable states of magnetic remanence and exhibiting a preferred direction of magnetization, and means for controlling the direction of magnetization in discrete portions of the film including magnetic field applying means, said thin film being arranged with a repetitively varying thickness to provide a cross-sectional profile resembling a sawtooth configuration in order to provide a repetitive pattern of coercive force variation along the length of the film.

8. An information storage device comprising: a thin film of a magnetic material capable of assuming bistable states of magnetic remanence and exhibiting a preferred direction of magnetization, and means for controlling the direction of magnetization in discrete portions of the film including magnetic field applying means, said magnetic film presenting a repetitively varying thickness between two selected values as a function of distance along the film in order to provide a repetitive pattern of coercive force variation along the length of the film.

9. An information storage device comprising: a thin film of a magnetic material capable of assuming bistable states of magnetic remanence and exhibiting a preferred direction of magnetization, and means for controlling the direction of magnetization in discrete portions of the film including magnetic field applying means, the thin film having a thickness which varies repetitively in a step-wise fashion between two selected values as a function of distance along the film in order to provide a repetitive pattern of coercive force variation along the length of the film.

10. An information storage device comprising: a thin film of a magnetic material capable of assuming bistable states of magnetic remanence and exhibiting a preferred direction of magnetization, and means for controlling the direction of magnetization in discrete portions of the film including magnetic field applying means, the thin film having a thickness which varies repetitively between the values of approximately 1000 to 2000 angstrom units in order to provide a repetitive pattern of coercive force variation along the length of the film.

11. An information storage device comprising: a thin film of a magnetic material capable of assuming bistable states of magnetic remanence and exhibiting a preferred direction of magnetization, and means for controlling the direction of magnetization at selected portions of the film, the film comprising a repetitively varying composition thereof in order to provide repetitive variations in the coercive force for limiting the boundaries of the portions of controlled magnetizations to substantially parallel, regularly spaced portions of the film.

12. An information storage device comprising: magnetic field applying means, and a thin film of a magnetic material capable of assuminng bistable states of magnetic remanence and exhibiting preferred directions of magnetization comprising a first layer of uniform thickness along the film and a second layer deposited on said first layer at selected portions of the film only.

13. An information storage device for storing information in the form of a pattern of directional magnetic domains comprising: a thin film of a magnetic material capable of assuming bistable states of magnetic remanence and exhibiting preferred directions of magnetization made up of alternate deposits of materials respectively exhibiting different values of coercive force in order that the coercive force exhibited by the thin film may vary in a repetitive fashion as a function of distance along at least one dimension of the film, and magnetic field applying means for controlling domain orientation in selected segments of the film.

14. Information storage apparatus comprising: a thin film of a magnetic material capable of assuming bistable states of magnetic remanence and arranged to retain an established pattern of magnetic domain orientation, means for establishing selected patterns of domain orientation in selected segments of the film, the coercive force of the thin film being varied in a repetitive pattern along one dimension thereof in order to define respective domain boundaries, means for encoding information to be stored in binary code, means for controlling said domain pattern establishing means in accordance with the corresponding binary code, and means for reading out the established domain orientations in respective segments of the thin film.

15. Information storage apparatus comprising: a thin film of alternate segments of magnetic material capable of assuming bistable states of magnetic remanence and exhibiting different values of coercive force, means for establishing selected patterns of domain orientation in selected segments of the film, means for encoding information to be stored in binary code, means for controlling the domain pattern establishing means in accordance with the resulting binary code, and means for reading out the established domain orientations in respective segments of the thin film including a pickup loop inductively coupled with the film for detecting the reversal of domain orientation direction.

16. Information storage apparatus comprising: a thin film of a magnetic material capable of assuming bistable states of magnetic remanence, the thin film being arranged with a repetitive variation in thickness in order to provide a repetitive pattern of coercive force variation along the length of the film, means for establishing selected patterns of domain orientation in selected segments of the film defined by said variations in coercive force, means for encoding information to be stored in binary code, means for controlling the domain pattern establishing means in accordance with the corresponding binary code, and means for reading out the established domain orientation in respective segments of the thin film comprising a pickup coil inductively coupled to the thin film for detecting a reversal of domain orientation in a segment of the film.

References Cited by the Examiner

UNITED STATES PATENTS

| | | | |
|---|---|---|---|
| 2,919,432 | 12/1959 | Broadbent ---------- | 340—174 |
| 2,984,825 | 5/1961 | Fuller et al. --------- | 340—174 |

OTHER REFERENCES

Pages 66–67, February 16, 1961, Publication I, "A Study of Switching in Thin Film," by Dietrich and Proebster, International Solid-State Circuits Conference.

IRVING L. SRAGOW, *Primary Examiner.*

J. W. MOFFITT, *Assistant Examiner.*